United States Patent
Buschnakowski et al.

(10) Patent No.: US 8,272,271 B2
(45) Date of Patent: Sep. 25, 2012

(54) DEVICE FOR MONITORING ONE OR MORE PROCESS VARIABLES

(75) Inventors: Stephan Buschnakowski, Chemnitz (DE); Jorg Uhle, Limbach-Oberfrohna (DE)

(73) Assignee: Endress + Hauser Conducta Gesellschaft Für Mess-Und Regeltechnik mbH+Co. KG, Gerlingen (DE)

( * ) Notice: Subject to any disclaimer, the term of this patent is extended or adjusted under 35 U.S.C. 154(b) by 197 days.

(21) Appl. No.: 12/662,666

(22) Filed: Apr. 28, 2010

(65) Prior Publication Data

US 2010/0281987 A1  Nov. 11, 2010

(51) Int. Cl.
*G01H 11/00* (2006.01)

(52) U.S. Cl. ........................ 73/649; 73/861.08

(58) Field of Classification Search .................. 73/649, 73/861.08, 861.18, 861.34, 862.59; 439/625, 439/660, 950
See application file for complete search history.

(56) References Cited

U.S. PATENT DOCUMENTS

| | | | | |
|---|---|---|---|---|
| 3,104,335 A | * | 9/1963 | Shoor | 310/329 |
| 4,682,847 A | * | 7/1987 | Moore et al. | 439/271 |
| 5,353,627 A | * | 10/1994 | Diatschenko et al. | 73/19.03 |
| 5,406,482 A | * | 4/1995 | McCoy et al. | 702/6 |
| 6,590,395 B2 | * | 7/2003 | Reykowski et al. | 324/322 |
| 6,705,898 B2 | * | 3/2004 | Pechstein et al. | 439/660 |
| 7,704,357 B2 | * | 4/2010 | Pechstein et al. | 204/406 |
| 7,785,151 B2 | * | 8/2010 | Feucht et al. | 439/660 |

FOREIGN PATENT DOCUMENTS

| | | |
|---|---|---|
| DE | 20 2007 018 307 U1 | 7/2008 |
| EP | 1 998 414 A2 | 12/2008 |
| GB | 2373805 * | 2/2002 |
| WO | WO 2004/102175 A1 | 11/2004 |

* cited by examiner

*Primary Examiner* — J M Saint Surin
(74) *Attorney, Agent, or Firm* — Bacon & Thomas, PLLC

(57) ABSTRACT

A device for determining or monitoring one or more physical and/or chemical, process variables and having a vibration sensor comprising, a plug-in element and a socket element, which are releasably connected by a pluggable connection and which communicate with one another via an interface, wherein, in the plug-in element or the socket element, a transducer is provided for determining or monitoring a process variable, and wherein the element not having the transducer has the vibration sensor, and the element having the vibration sensor is connectable with a superordinated unit.

16 Claims, 1 Drawing Sheet

DEVICE FOR MONITORING ONE OR MORE PROCESS VARIABLES

TECHNICAL FIELD

The present invention relates to a device for determining and/or monitoring one or more physical and/or chemical, process variables, wherein a vibration sensor is provided.

BACKGROUND DISCUSSION

In industrial processes, various types of devices are applied, which measure, monitor, or, in given cases, control, physical or chemical, process variables, including variables such as e.g. temperature and pH-value. Such devices are subject to mechanical oscillations and vibrations from different process-related sources. This can lead to wear of a device, such that it no longer operates faultlessly. Even the complete failure of a device is possible. In order to be able to detect damage to a device or to predict when it might fail, a technique is to position a vibration sensor on a device participating in the process. A process device in combination with a vibration sensor is described in published International Application WO 2005/033639 A2.

The process device can be, for example, a sensor for monitoring a process variable. The vibration sensor is integrated into the sensor. A disadvantage of positioning directly on the device is that, in the case of malfunction or diagnosed imminent failure of the device, the device together with the vibration sensor must be replaced. The vibration sensor can, indeed, also be placed as an element on a superordinated control unit; however, then such must be located in direct contact with the process, which is, most often, not the case.

SUMMARY OF THE INVENTION

An object of the invention is, consequently, to provide a device, with which it is possible to utilize a vibration sensor in a more efficient manner.

The object is achieved by a device comprising a plug-in element and a socket element, these being releasably connected by a pluggable connection and communicating with one another via an interface, wherein the plug-in element or the socket element has a transducer for determining or monitoring at least one process variable and the vibration sensor is associated with the, in each case, other element, i.e. with the element which does not have the transducer, wherein the plug-in element or socket element, with which the vibration sensor is associated, is connectable with a superordinated unit.

As soon as the pluggable connection between plug-in element and socket element is produced, the vibration sensor measures vibrations and oscillations also experienced by the transducer. The pluggable connection, with which plug-in element and socket element are held together, is, preferably, a bayonet connection.

A sensor, which exhibits the described dividing in two, is available from Endress+Hauser under the mark MEMOSENS. This device is, most often, a potentiometric sensor, as described in published International Application WO 2004/102175 A1. A possible form of pluggable connection is shown in the European Patent EP 1 998 414 A2 of Endress+Hauser. For details of the embodiment, consequently, reference is made to these documents.

Because vibration sensor and transducer are accommodated in separate housings, there results the advantage that in the case of damage to the device, only the part comprising the transducer needs to be replaced, not, however, the part comprising the vibration sensor and other electronics. This is especially of advantage, when the sensor is a sensor experiencing high wear, such that it must frequently be renewed. This can involve, for example, a potentiometric sensor for determining pH-value of a fluid medium, which, due to its chemical character, attacks electrodes of the sensor.

A further advantage of the invention results in the case of retrofitting a vibration sensor into a device, which is already operating. The socket element or plug-in element associated with the transducer can be left in the process, while the other, element connectable to the superordinated unit can be replaced with a new element supplementally containing the vibration sensor. Because of the pluggable connection of plug-in element and socket element, this replacement is simple and can be accomplished in a short period of time.

In a first embodiment of the invention, the transducer is, preferably, a sensor for measuring pH-value of a medium, wherein, preferably, supplementally, a sensor for determining temperature of the medium is provided.

In a preferred embodiment of the device of the invention, a memory unit is provided for that plug-in element or socket element, for which also the transducer is intended, and in which data needed for calibrating the transducer are stored. The memory unit can, in such case, contain transducer-specific data and/or process-specific data.

Another embodiment of the invention provides that the plug-in element or socket element, with which the transducer is associated, contains a unit for processing and/or storing the measurement data of the transducer. The unit is, for example, a microprocessor.

Another embodiment of the invention provides at least one microcontroller for processing and/or storing the data of the vibration sensor and/or the transducer. This at least one microcontroller is, preferably, associated with that plug-in element or socket element, for which also the vibration sensor is intended.

In a further development of the device of the invention, a data processing unit is provided, which, for example, functions as a producer and/or transmitter of a digital signal representing the measured variable. The digital signal is transmitted, for example, to a display element or to a superordinated unit.

In an additional embodiment of the solution of the invention, the plug-in element and the socket element are connected with one another via a galvanic, or a contactless, interface for energy supply and/or data transmission. In such case, the terminology 'contactless' means that the interface in the plug-in element is isolated electrically, or galvanically, from the interface in the socket element. The contactless interface is, for example, embodied as a capacitive, optical or, preferably, inductive interface and has the advantage that dust particles or other impurities, should these reach the inner region of the pluggable connection, bring about no disturbances in the energy, or data, transmission.

In a further development of the solution of the invention, the vibration sensor is an accelerometer.

In an additional development of the device of the invention, at least one microcontroller is provided for producing an error, or warning, report based on the measured values of the vibration sensor. This error, or warning, report serves, for example, for indicating a too high mechanical loading of the transducer. Preferably, a warning is produced, when the frequency of the process related vibration, as measured by the vibration sensor, comes near to an eigenfrequency of the device. In this way, possible damage or destruction of the device because of resonant oscillations is prevented.

BRIEF DESCRIPTION OF THE DRAWINGS

A possible embodiment of the invention will now be explained in greater detail on the basis of the appended drawing, the figures of which show as follows.

DETAILED DISCUSSION IN CONJUNCTION WITH THE DRAWINGS

Figure 1:
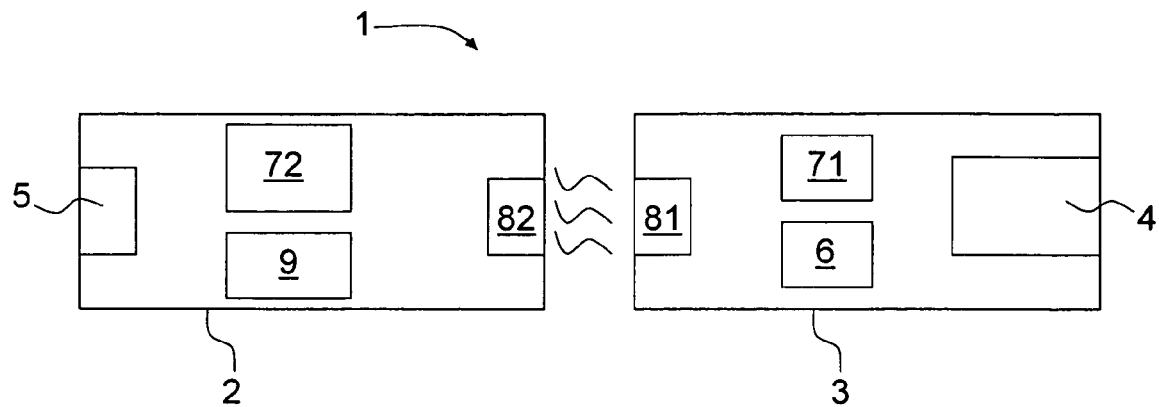
FIG. 1 is a block diagram of a device of the invention.

FIG. 1 shows the block diagram of a possible embodiment of the device of the invention 1. In this example, the element of the pluggable connection 10, which has the transducer 4, is embodied as plug-in element 3. The vibration sensor 9 and the interface to the superordinated unit 5 are contained in socket element 2. Of course, the socket element 2 can also have the transducer 4, in which case the plug-in element 3 then has the interface to the superordinated unit 5 and the vibration sensor 9. The elements, which are associated in the following with the socket element 2 or the plug-in element 3 are then correspondingly moved to the plug-in element or to the socket element, as the case may be. The pluggable connection 10 is advantageously a bayonet connection (FIG. 2), while, of course, other types of connections will come to mind for those skilled in the art.

Located in the plug-in element 3 is, besides the transducer 4, a memory unit 6, which contains transducer-specific data, such as process data, device data, and/or historical data. This enables, on the one hand, a precalibration of the transducer 4 before the mounting at the location of use, and, on the other hand, the attachment of the transducer 4 to different transmitters (here the socket element 2), without a new calibration being absolutely required.

Further arranged in the plug-in element 3 is a microprocessor 71. This includes, preferably, an integrated analog to digital converter, in order to convert the analog, measured values of the transducer 4 into digital values, which then, on the one hand, can be stored in the memory element 6, and, on the other hand, can be forwarded via an interface 81, 82 to the data processing unit 72 in the socket element. The interface 81, 82 is an inductive interface for communication between plug-in element 3 and socket element 2. Additionally, the energy supply of the transducer 4 occurs via this interface. The interface can also be another type of contactless interface, such as, for example, a capacitive or optical interface, or it can be a galvanic interface. The advantage of the contactless interface lies in the galvanic isolation between plug-in element 3 and socket element 2, whereby dust, moisture, or other disturbing factors cannot degrade the ability of the interface to transfer signals. Additionally, then no leakage currents can arise.

Contained in the socket element 2 of the pluggable connection 10 is a data processing unit 72. This can serve for storing and/or processing the data delivered by the vibration sensor 9. There is then also the opportunity to process the data obtained via the interfaces 81, 82 from the transducer 4.

Figure 2:
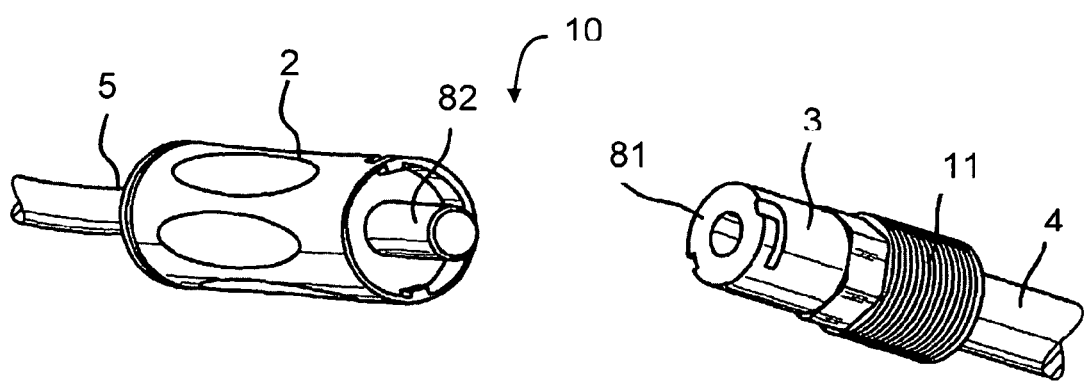
FIG. 2 is a perspective, detail view of the pluggable connection of a device of the invention.

FIG. 2 is a perspective representation of a device 1 of the invention, wherein the focus is on a pluggable connection 10. The interface for superordinated unit 5, as well as the vibration sensor 9, are, also in this example, accommodated in the socket element 2. The plug-in element 3 contains the transducer 4. The plug-in element 3 of the device 1 includes a screw thread 11, with the help of which the transducer 4 can be mounted in a retractable assembly.

The plug-in element 3 includes a cylindrical end section, in whose lateral surface the cavities of a bayonet connector are arranged. Arranged in this end section is also the inductive interface 81. The hole in this end section serves for accommodating a jacketed ferrite core, which is part of the inductive interface 82 of the socket element 2. On the surface of the jacket surrounding the ferrite core are protrusions, which match cavities of the plug-in element 3 and serve for securing the bayonet connector.

List Of Reference Characters
1 device
2 socket element
3 plug-in element
4 transducer
5 interface for superordinated unit
6 memory unit
71 microcontroller
72 data processing unit
81 inductive interface in the plug-in element
82 inductive interface in the socket element
9 vibration sensor
10 pluggable connection
11 screw thread

The invention claimed is:

1. A device for determining or monitoring one or more physical and/or chemical process variables comprising:
a vibration sensor;
a plug-in element;
a socket element, said plug-in element and said socket element being releasably connected by a pluggable connection and which communicate with one another via an interface; and
a transducer provided in said plug-in element or said socket element for determining or monitoring the process variable, wherein:
the element not having said transducer comprises said vibration sensor; and
the element comprising said vibration sensor is connected with a superordinated unit.

2. The device as claimed in claim 1, wherein:
the process variable comprises a pH-value.

3. The device as claimed in claim 1, wherein:
the process variable comprises temperature.

4. The device as claimed in claim 1, further comprising:
a memory unit located in said plug-in element or said socket element comprising said transducer wherein:
transducer-specific or process-specific data are stored in said memory unit.

5. The device as claimed in claim 1, further comprising:
a microcontroller for storing and/or processing data of said transducer, said microcontroller being situated in said plug-in element or said socket element comprising said transducer.

6. The device as claimed in claim 1, further comprising:
at least one microcontroller for processing and/or storing data from said transducer and/or said vibration sensor, said at least on microcontroller being situated in said plug-in element and/or said socket element comprising said vibration sensor.

7. The device as claimed in claim 1, wherein:
said interface between said plug-in element and said socket element is one of: an inductive, capacitive, and optical interface.

8. The device as claimed in claim 1, wherein:
said interface between said plug-in element and said socket element is a galvanic interface.

9. The device as claimed in claim 1, wherein:
said vibration sensor is an accelerometer.

10. The device as claimed in claim 1, further comprising
at least one microcontroller for producing, based on measured values of said vibration sensor, a warning, which serves for indicating a too high mechanical loading of said transducer.

11. The device as claimed in claim 1, further comprising:
at least one microcontroller, which, based on measured values of said vibration sensor, produces a warning, when the frequency of process related vibration measured by said vibration sensor comes near to an eigenfrequency of the device.

12. The device as claimed in claim 1, wherein:
said vibration sensor is adapted to detect mechanical oscillations and vibrations also experienced by the transducer when said plug-in element and said socket element are releasably connected by said pluggable connection.

13. A device for determining or monitoring one or more physical and/or chemical process variables comprising:
a vibration sensor which is adapted to detect mechanical oscillations and vibrations;
a plug-in element;
a socket element, said plug-in element and said socket element being releasably connected by a pluggable connection and which communicate with one another via an interface; and
a transducer provided in said plug-in element or said socket element for determining or monitoring the process variable, wherein:
the socket element comprises said vibration sensor and an interface to a superordinated unit.

14. The device as claimed in claim 13, further comprising:
a microcontroller for storing and/or processing data of said transducer, said microcontroller being situated in said plug-in element.

15. The device as claimed in claim 13, further comprising:
at least one microcontroller for storing and/or processing data from said transducer and/or said vibration sensor, said at least one microcontroller being situated in said socket element.

16. The device as claimed in claim 15, wherein:
said microcontroller is provided for producing an error or warning report indicting a too high mechanical loading of the transducer based on the measured values of the vibration sensor.

* * * * *